UNITED STATES PATENT OFFICE.

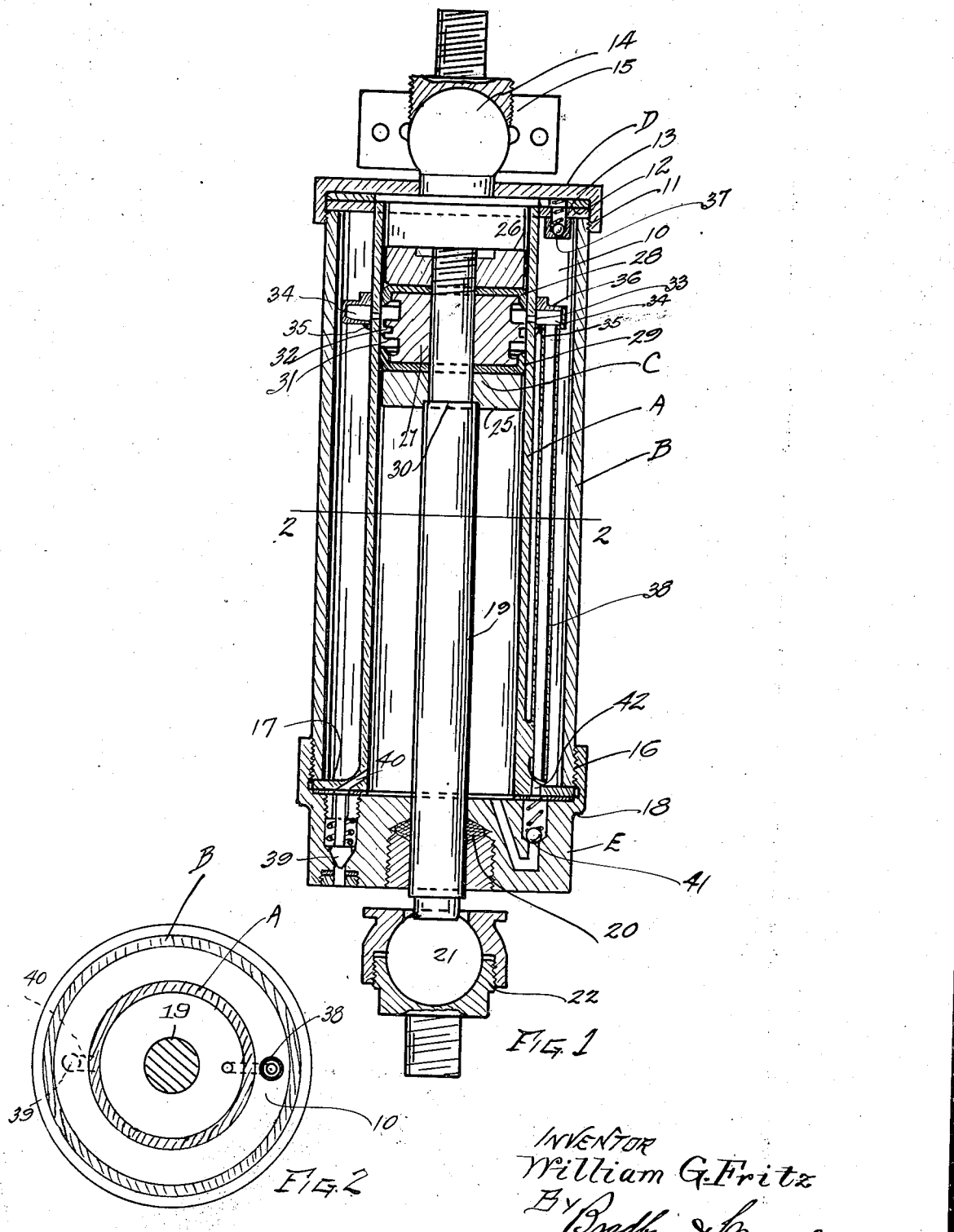

WILLIAM G. FRITZ, OF CLEAR LAKE, MINNESOTA.

SHOCK ABSORBER.

1,426,058.  Specification of Letters Patent.  Patented Aug. 15, 1922.

Application filed November 11, 1920. Serial No. 423,330.

*To all whom it may concern.*

Be it known that I, WILLIAM G. FRITZ, a citizen of the United States, residing at Clear Lake, in the county of Sherburne and State of Minnesota, have invented a new and useful Shock Absorber, of which the following is a specification.

This invention relates to shock absorbers, particularly although not exclusively, for use in connection with spring supported vehicle bodies. More particularly this invention pertains to that class of shock absorbers which uses air as a cushioning medium and which is employed for reducing shock and assisting in resiliently supporting vehicle bodies upon the running mechanism of vehicles.

It is one of the objects of the present invention to provide shock absorbers between the vehicle body and the axle housing of the running gear, which will most efficiently and effectively absorb any shock in supporting the load and assist in interposing effective cushioning means both for the up and down movement of the body on the axle, said means being provided with universal connections between the axle housing and the body which will conform with the load and permit free lateral movement of the body at all times.

Another object of the invention is to provide improved construction of shock absorbers which is durable, simple and inexpensive and which is not liable to disorder after long continued use.

A still further object of the invention is to provide means for automatically lubricating the working parts of the invention, so as to reduce wear, reduce leaking and maintain the working parts most efficiently for the work which they perform and so that they will function without fail.

With these and other objects in view, my invention comprises the features of construction and combination of parts hereinafter more particularly described and claimed, particular reference being had to the accompanying drawing, in which Fig. 1 is a vertical section of my improved shock absorber, part of the fastening means by which the device is attached to the vehicle being illustrated; and Fig. 2 is a section of Fig. 1 taken on the line 2—2.

In the accompanying drawing, A and B indicate two inner and outer cylinders spaced apart to assist in forming an air expansion chamber 10, said inner cylinder assisting in forming an air compression space in which a piston C is adapted to reciprocate. The upper ends of the two cylinders are held together by a cap D, the side of which is threaded at 11 over the outer cylinder. A metal ring 12 and washer 13 are placed between the upper end of the outer cylinder and cap to assist in producing a tight joint. A ball 14 on the upper end of the cap and a socket member 15 serve to connect the device with the frame or body of a vehicle. The lower ends of the cylinders are closed and held together by an inverted cap E, the side of which is threaded at 16 over the outer cylinder. The lower end of the inner cylinder has a flange 17 placed below the lower end of the inner cylinder in the inverted cap and a washer 18 between the flange and the inner surface of the inverted cap serves to assist in producing a tight closure when the inverted cap is screwed firmly over the lower end of the outer cylinder.

The piston C carries a piston rod 19 which slides through the lower inverted cap E, a gland 20 being provided to assist in forming a tight working connection. The lower end of the piston rod has a ball 21 working in a socket 22, said socket member and ball serving to connect the device with the axle housing or other member of the vehicle. Thus during the up and down movement of the parts to which the socket members 15 and 22 are connected, the piston is reciprocated in the inner cylinder, the upper chamber therein constituting an air cushioning chamber to support the load and the chamber below the piston constituting a rebound air compression chamber to cushion the upward movement of the load.

The piston comprises a pair of end plates 25 and 26, a body member 27 placed between the end members and a pair of washers 28 and 29; one being placed between the body member and each of the end members with its edge turned inwardly over the body member to form a tight working connection between the cylinder A and piston. All of these parts constituting the piston are clamped closely together with the end member 25 resting upon a shoulder 30 on the piston rod and the end member 26 threaded upon the upper end of the piston rod. The body member 27 is of smaller diameter than the inner diameter of the cylinder A to provide an oil chamber for lubricating the piston and is formed with a shoulder 31 and an annular groove 32 in said shoulder for distributing the lubricant more evenly over the surface of the cylinder. In use oil is placed in the oil chamber within the body member 27 when the device is assembled but a further supply is maintained through port passages 33 in the wall of the cylinder A, with which the piston registers from time to time in its reciprocable movement. A hollow circular ring 34 around the cylinder and with which the ports 33 communicate, acts as an oil well, said ring being supported upon a shoulder 35. The upper portion 36 of this well acts as a large check valve, being raised by air to permit air to escape more freely back into the expansion chamber 10. As air pressure forces the piston downward the valve 36 falls into place and closes, compelling air to enter the upper portion of cylinder A through the check valve 37 to be hereinafter described. The well 34 is provided with a depending supply tube 38 which terminates near the lower portion of the air compression space, its lower end being attached by soldering, or other suitable means, to the outer wall of the cylinder A. By this means oil received into the compression space 10 is adapted to be blown up and into the well 34 from whence it enters the piston.

Air is admitted into the cushioning chamber below the piston by a check valve 39 and a duct 40. This air is forced into the expansion chamber 10 through a check valve 41 and from the compression chamber it enters the space above the piston. In this manner the cushioning effect is equalized on both sides of the piston. When fully compressed any leakage is immediately taken up by a suction stroke of the piston and any lubricating oil collecting in the lower end of cylinder A from its wall is carried by the compressed air into the compression chamber 10 and blown upwardly into the well 34 and the piston, the duct 42 from check valve 41 entering the compression space immediately below the lower end of tube 38. This action tends to spread the washers 28 and 29 into tight connection with the surface of the cylinder, thus at all times maintaining a substantially leak proof joint.

The valves 37 and 39 shut off the return of air during down or up compression movements of the piston, an effective cushion below and above the piston being always maintained. The expansion chamber 10 assists in equalizing the compression of the air so that substantially the same cushioning effect is provided above the piston as below. The lubricating means described provides a continuous circulation of lubricating medium throughout the structure, the oil being used over and over as fast as it collects in the lower portion of the cylinder A. It is, therefore, only necessary to very seldom replenish the supply of lubricating medium in the device.

In operation the piston head is normally stationed substantially midway of the inner cylinder and beneath the openings 33 in said cylinder. Relative reciprocation of the cylinder and piston members will of course, pump air into the upper part of the inner chamber. The pressure of this compressed air is relieved, however, through the openings 33 and check valve.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to protect by Letters Patent is:

1. A shock absorber, comprising, in combination, a piston, a pair of cylinders of different diameters forming an enlarged expansion chamber and in the smaller of which cylinders the piston is reciprocably disposed and divides the space into upper and lower cushioning chambers, means connecting the cylinders with a body to be supported, means connecting the piston with a support, means for admitting air to the inner cylinder from the outer atmosphere to form a pneumatic cushion between said cylinder and piston, pressure transferring means connected with the expansion chamber and with the upper and lower cushioning chambers, and means for relieving compressed air back into the expansion chamber from the upper cushioning chamber at a point below the upper end of the stroke of the piston.

2. A shock absorber, comprising, in combination, a piston, a pair of cylinders of different diameters forming an enlarged expansion chamber and in the smaller of which cylinders the piston is reciprocably disposed and divides the space into upper and lower cushioning chambers, means connecting the cylinders with a body to be supported, means connecting the piston with a support, means for admitting air to the inner cylinder from the outer atmosphere to form a pneumatic cushion between said cylinder and piston, pressure transferring means connected with the expansion chamber and with the upper and lower cushioning chambers, and means for relieving compressed air back into the expansion chamber from the upper cushioning chamber below the upper end of the stroke of the piston to form a more substantial air cushion for the piston.

3. A shock absorber, comprising, in combination, a piston, a pair of inner and outer cylinders spaced apart and closed at their ends and forming an expansion chamber between, said piston being reciprocably disposed in the inner of said cylinders and dividing the space therein into upper and lower cushioning spaces, means for admitting the outer atmosphere into the lower cushioning space, pressure transferring means connected with the expansion chamber and with the upper and lower cushioning chambers and means for relieving part of the pressure from the upper cushioning chamber.

4. A shock absorber, comprising, in combination, a piston, a pair of inner and outer cylinders spaced apart and closed at their ends and forming an expansion chamber between, said piston being reciprocably disposed in the inner of said cylinders and dividing the space therein into upper and lower cushioning spaces, means for admitting air into the lower cushioning space, pressure transferring means connected with the expansion chamber and with the upper and lower cushioning chambers, means for relieving part of the pressure from the upper cushioning chamber and a lubricating reservoir associated with said expansion chamber and having a valved ingress duct entering the upper cushioning chamber through the wall thereof in connection with the bearing surface of the piston during part of the piston stroke.

5. A shock absorber, comprising, in combination, a piston, a pair of inner and outer cylinders spaced apart and closed at their ends and forming an expansion chamber between, said piston being reciprocably disposed in the inner of said cylinders and dividing the space therein into upper and lower cushioning spaces, means for admitting air into the lower cushioning space, pressure transferring means connected with the expansion chamber and with the upper and lower cushioning chambers, means for relieving part of the pressure from the upper cushioning space, and lubricating transferring means in said expansion chamber and entering said upper cushioning space through the side wall of the inner cylinder, whereby lubricating medium in the expansion chamber is adapted to be applied to the contact surfaces between the inner cylinder and piston.

In testimony whereof, I have signed my name to this specification.

WILLIAM G. FRITZ.